United States Patent [19]

Uehara

[11] Patent Number: 5,385,224
[45] Date of Patent: Jan. 31, 1995

[54] CLUTCH COVER ASSEMBLY

[75] Inventor: Hiroshi Uehara, Neyagawa, Japan

[73] Assignee: Kabushiki Kaisha Daikin Seisakusho, Osaka, Japan

[21] Appl. No.: 42,873

[22] Filed: Apr. 5, 1993

[30] Foreign Application Priority Data

Apr. 6, 1992 [JP] Japan ................ 4-020677[U]

[51] Int. Cl.⁶ .................... F16D 13/50; F16D 13/58
[52] U.S. Cl. ................ 192/52; 192/70.27; 192/89.23; 192/89.24; 192/109 A
[58] Field of Search .......... 192/70.27, 109 A, 89 PH, 192/89 PL, 52, 89.23, 89.24

[56] References Cited

U.S. PATENT DOCUMENTS

| | | | |
|---|---|---|---|
| 1,912,649 | 6/1933 | Meyer | 192/109 A X |
| 3,323,624 | 6/1967 | Maurice | 192/109 A X |
| 3,944,036 | 3/1976 | Koshelev | 192/109 A X |
| 4,291,792 | 9/1981 | Henao | 192/89 B |
| 4,696,384 | 9/1987 | Huber | 192/89 PL X |
| 5,022,508 | 6/1991 | Fukuda | 192/70.27 |
| 5,074,395 | 12/1991 | Maki et al. | 192/89 PH X |
| 5,090,539 | 2/1992 | Wolf et al. | 192/109 A X |

FOREIGN PATENT DOCUMENTS 0249469 12/1987 European Pat. Off. .......... 192/89 B

Primary Examiner—Rodney H. Bonck
Attorney, Agent, or Firm—Knobbe, Martens, Olson & Bear

[57] ABSTRACT

A clutch cover assembly comprising, in addition to a clutch cover containing a pressure plate and a diaphragm spring, a spring washer in location and retainment such that it provides cushioning against clutch engagement shock. In a recess in the pressure plate adjacent the diaphragm spring, the spring washer is supported on opposite corresponding sides on annular fulcra, which in clutch disengagement are staggered laterally of the spring washer and remote from each other. During clutch engagement, the spring washer deforms elastically as it transmits the impelling force of the diaphragm spring in tandem therewith, flexing on the fulcra and therein cushioning the clutch-engaging force of the diaphragm spring. One of the annular fulcra is along a curved bottom surface of the clutch pressure plate recess, and as the load from the diaphragm spring on the spring washer increases, the fulcrum locus of contact thus shifts along the washer, approaching the other annular fulcrum. The distance separating the fulcra thus decreases such that the cushioning rigidity of the spring washer Increases gradually with the increasing load as the clutch is engaged. Cushioning characteristics reflecting a parabolic response comparable to that of clutch cover assemblies employing conventional cushioning plates on the clutch disc are realized.

6 Claims, 4 Drawing Sheets

CLUTCH COVER ASSEMBLY

CROSS-REFERRENCE TO RELATED APPLICATION

This application is related to copending application Ser. No. 07/971,960 filed Nov. 5, 1992, commonly assigned with the present invention.

BACKGROUND OF THE INVENTION

The present invention relates to a clutch cover assembly, and particularly, to a clutch cover assembly for clamping a clutch disc between an input plate member and itself.

A clutch cover assembly employed in the clutch of an automobile generally comprises a dish-shaped clutch cover, a pressure plate located within the clutch cover, and a diaphragm spring for impelling the pressure plate toward a clutch disc. When the pressure plate is pressed against the clutch disc, the clutch disc becomes clamped between the pressure plate and, as a typical input member, an engine flywheel, thereby engaging the clutch.

Some conventional clutch discs are composed having a plurality of ridged or corrugated cushioning plates fastened to lateral faces of the disc, and a pair of friction material facing rings bonded to the cushioning plates. Such cushioning plates cushion against shocks of clutch engagement, effecting cushioning characteristics represented In a parabolic, gently-sloping curve.

However, it can be difficult to achieve cushioning of desired characteristics using the aforementioned cushioning plates, since through manufacture the cushioning response of each cushioning plate will vary. Furthermore, high temperatures developing In the clutch disc degrade the cushioning plates, reducing the degree of cushioning. Consequently, it is impracticable to maintain original cushioning characteristics.

The applicant has disclosed a clutch cover assembly in Japanese Utility Model Application No. 91681/1991 wherein the cushioning plates are omitted and a disc spring, i.e., a spring washer, is disposed between the diaphragm spring and the pressure plate instead. Impelling force of the diaphragm spring is transmitted to the pressure plate through the spring washer. Cushioning with this structure exhibits very accurate characteristics, and the spring washer is much less susceptible to the effects of high temperatures in the clutch disc, maintaining longevity of the desirable cushioning characteristics.

Characteristics of the cushioning, however, are such that rigidity therein rises suddenly when a circumferential edge of the spring washer in deformation abuts against the pressure place, generating shock during clutch engagement.

SUMMARY OF THE INVENTION it is an object of the present invention to maximize the longevity of the initial characteristics of clutch engagement cushioning, wherein the curve representing those characteristics is parabolic and gently-sloping.

A clutch cover assembly according to an aspect of the present invention clamps a clutch disc between itself and an input plate member. The clutch cover assembly comprises a dish-shaped clutch cover, a pressure plate, a diaphragm spring and a spring washer. The pressure plate is located within the clutch cover and has a pressure surface which presses the clutch disc against the input plate member. The diaphragm spring is supported by the clutch cover and impels the pressure plate against the input plate member. The spring washer elastically deforms as it transmits the impelling force of the diaphragm spring to the pressure plate. The spring washer is located between the pressure plate the diaphragm spring wherein radially inner and outer margins staggered on opposite sides thereof are respectively supported by the pressure plate and the diaphragm spring in such a way that the distance between the support fulcra decreases as the spring is deformed.

In this clutch cover assembly, the diaphragm spring presses the pressure plate toward the clutch disc through the spring washer. After the clutch disc is just clamped between the pressure plate and the input plate member, the spring washer begins to deform, being further impelled by the diaphragm spring. Thereupon, rigidity between both the support fulcra of the spring washer increases higher gradually, such that cushioning characteristics reflecting a parabolic response comparable to that of conventional cushioning plates are realized. In addition, the spring washer Is situated ulterior to the pressure surface of the pressure plate, such that it is much less susceptible to the effects of high temperatures in the clutch disc, maintaining longevity of the desired cushioning characteristics.

The foregoing and other objects, aspects and advantages of the present invention will become more apparent from the following detailed description, taken in conjunction with the accompanying drawings.

DESCRIPTION OF THE PREFERRED EMBODIMENTS

Figure 1:
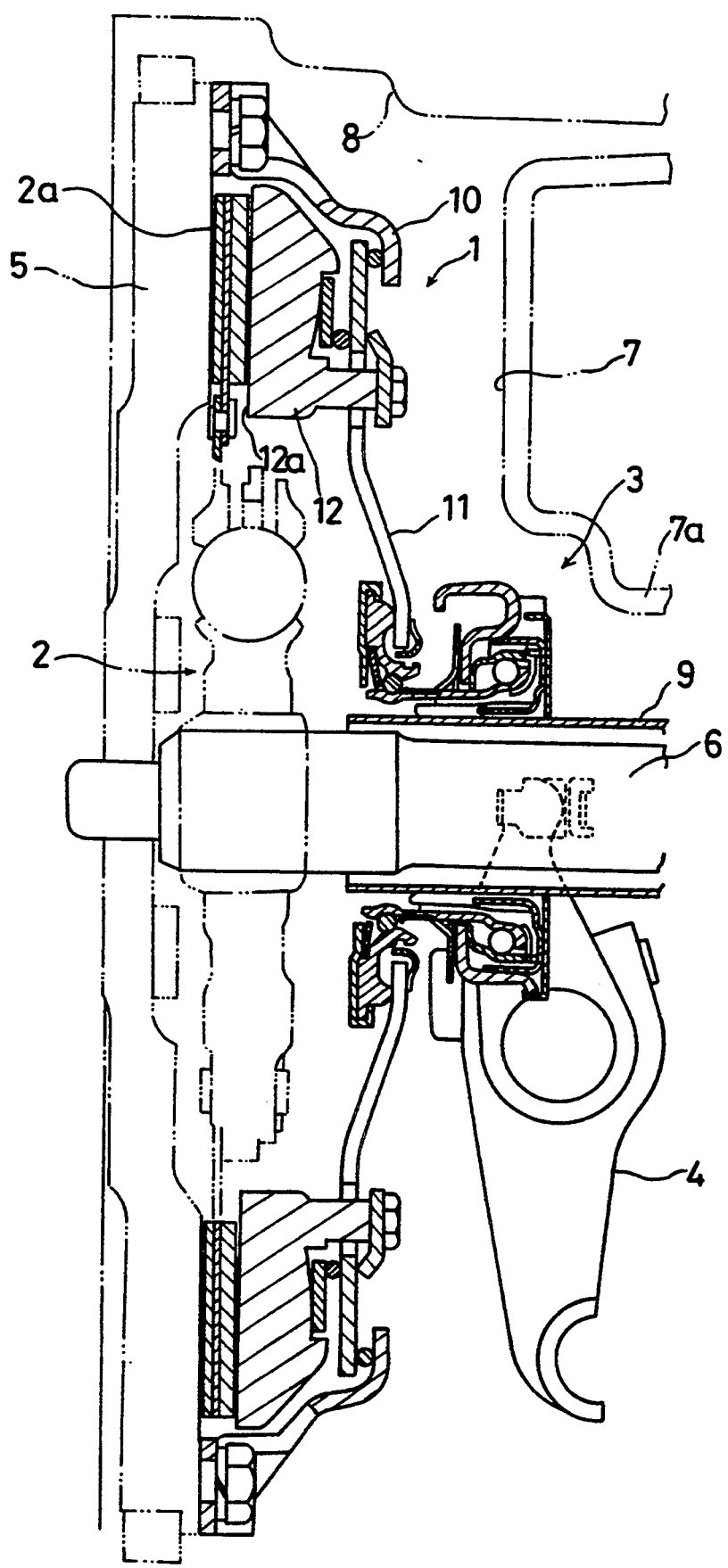
FIG. 1 is a cross sectional view showing a pull-type clutch to which an embodiment of the present invention is applied.

FIG. 1 shows a pull-type clutch to which an embodiment of the present invention Is applied.

The pull-type clutch consists chiefly of a clutch cover assembly 1, a clutch disc assembly 2 and a release assembly 3. A release fork 4 is connected to the release assembly 3 in order to actuate it in the axial direction. The clutch cover assembly 1 is mounted on an engine flywheel 5.

Rearward (rightward in FIG. 1) of the clutch cover assembly 1 is a transmission housing 7, from which a main drive shaft 6 extends forward into splined engagement with the clutch disc assembly 2. A clutch housing 8 is provided on the forward end of transmission housing 7, enclosing the clutch cover assembly 1 and the flywheel 5. Centrally provided through a front end wall 7a of the transmission housing 7 is a collar 9 through which the main drive shaft 6 penetrates.

A pair of friction material facings 2a are laterally provided along either of peripherally marginal surfaces of the clutch disc assembly 2, and are clamped between the flywheel 5 and the pressure plate surface 12a of a pressure plate 12 (as described later). The friction facings 2a are bonded to the planar surfaces of a disc instead of to cushioning places, as is conventional. The tip of the main drive shaft 6 is in splined engagement with the central portion of the clutch disc 2.

Figure 2:
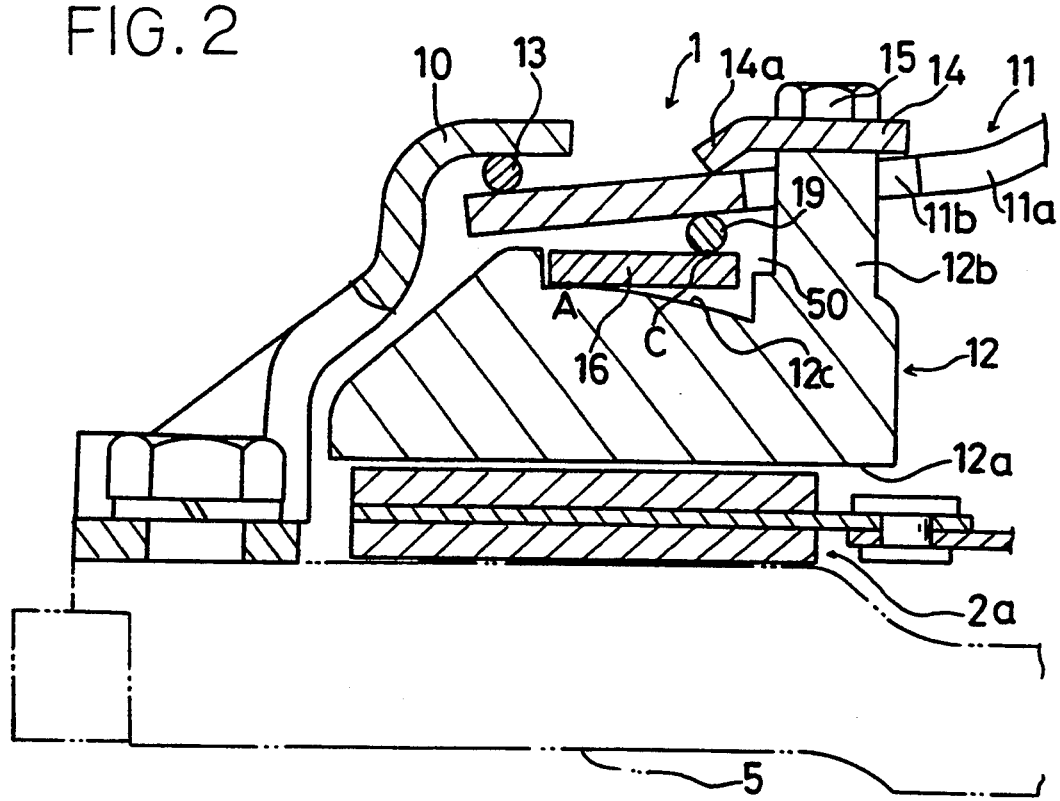
FIG. 2 is a partial enlarged view of FIG. 1.

FIG. 2 shows a part of the clutch cover assembly 1 as an embodiment of the present invention. A clutch cover 10, a diaphragm spring 11, and an annular pressure plate 12, major components of the clutch cover assembly 1, are depicted partially in FIG. 2.

The clutch cover 10 is dish-shaped, having a large-diameter central opening, wherein the rim of the dish is fastened to the flywheel 5.

The diaphragm spring 11 is a disc member coaxial with the clutch cover 10. The radially outward margin of the diaphragm spring 11 is supported by the clutch cover 10 on a first pivot ring 13. The diaphragm spring 11 impels the pressure plate 12 toward the flywheel 5 by the elasticity of its radially middle portion, wherein the first pivot ring 13 acts as a fulcrum. The radially inward portion of the diaphragm spring 11 is connected to the release assembly 3, such that extraction of the radially inward portion transmission-ward (rightward in FIG. 1) releases engagement of the clutch disc 2. A plurality of radial slits 11a is formed in the diaphragm spring 11 from the radially inward edge to the radially middle portion. A circular hole 11b is formed toward the end of each slit 11a. The pressure plate 12 clamps the friction facings 2a of the clutch disc 2 between itself and the flywheel 5 in order to engage the clutch.

As shown in FIG. 2, a facing of the pressure plate 12 constitutes a pressure surface 12a opposite an adjacent friction facing 2a. Radially inward along the opposite side of the pressure plate surface 12a are a plurality of dowels 12b extending axially toward the transmission. Each hole 11b of the diaphragm spring 11 is penetrated by a dowel 12b. An annular retaining plate 14 is fixed to the dowels 12b by bolts 15. The retaining plate 14 has a bent portion 14a along its radially outward edge inclined toward the pressure plate 12.

The face of the pressure plate 12 opposite the pressure surface 12a is recessed by an annular channel 50. The bottom surface 12c of the channel 50 curves gradually deeper in the direction radially inward. The radially outer margin on one side of the flat, annular spring washer 16 is supported in the bottom surface 12c along a fulcrum annular locus at A in FIG. 2 (when the clutch is not in engagement), and the radially inner margin on the opposite side is supported along annular fulcrum C in FIG. 2 by the diaphragm 11 through a second pivot ring 19.

Impelling pressure from the diaphragm spring 11 is thus transmitted to the pressure plate 12 through the second pivot ring 19 and the spring washer 16.

Now, operation of the clutch cover assembly 1 will be explained.

As shown in FIG. 2 wherein the clutch is released, the spring washer 16 is supported on annular fulcrum C and at laterally staggered annular locus A.

Wherein the release fork 4 is not pulling the release assembly 3 toward the transmission, the elasticity of diaphragm spring 11 presses the pressure plate 12 against the flywheel 5 wherein the radially outer edge of the diaphragm spring 11 is supported on a portion of the clutch cover 10 as a fulcrum, and its radially middle portion impels the pressure plate 12 toward the flywheel 5. Consequently, the pressure plate 12 presses the corresponding friction facing 2a into contact against the flywheel 5.

Figure 3:
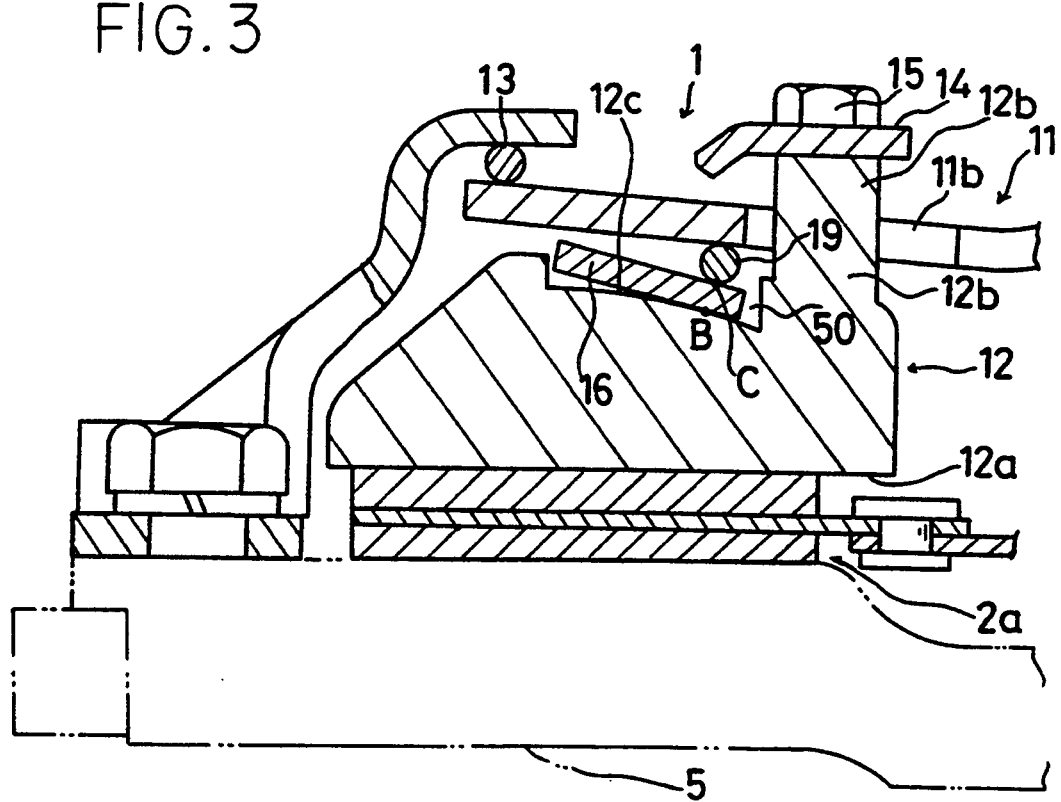
FIG. 3 is a view to illustrate engagement vs. disengagement of the clutch, corresponding to FIG. 2.

Initially, then, the friction facings 2a are just clamped between the pressure plate 12 and the flywheel 5, thereby riding the clutch. As the diaphragm spring 11 continues to urge, the radially inner edge of the spring washer 16 elastically deforms toward the pressure plate 12. During this deformation stage, the locus of contact where the pressure plate 12 supports the spring washer 16 shifts from A to B, as shown in FIG. 3, but the annular fulcrum on which the diaphragm spring 11 supports the spring washer 16 does not move from C. That is, the distance between the two fulcra supporting the spring washer 16 gradually decreases during clutch engagement. The reduced distance results in higher pressure against the pressure plate 12. Accordingly, the cushioning characteristics of the spring washer 16 in the preferred embodiment are as shown in FIG. 6.

Figure 6:
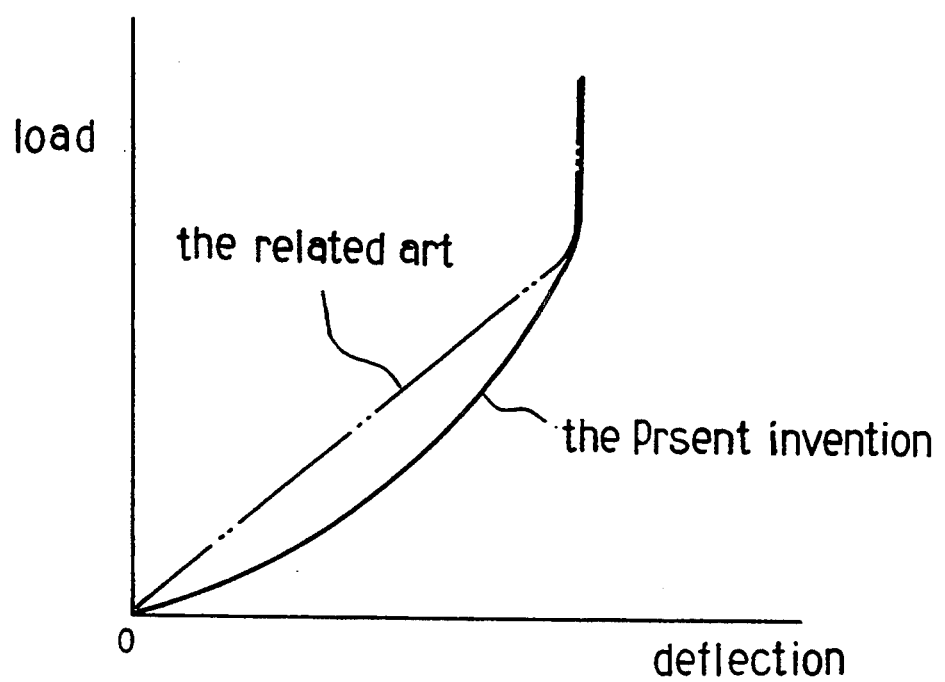
FIG. 6 is a graph showing cushioning characteristics.

Referring to FIG. 6, the cushioning characteristics of the spring washer 16 are graphed as a relation between load on the spring washer 16 and its deflection, measured as change in the axial direction of the position of the spring washer 16 from the onset to the completion of its elastic deformation. The chain line therein shows cushioning characteristics of a spring washer wherein the distance between the support fulcra does not change during elastic deformation, such that is rigidity suddenly increases when the spring washer inner edge abuts against the pressure plate. The solid line shows cushioning characteristics of the spring washer 16, wherein the distance between the support Fulcra decreases gradually. Correspondingly, rigidity of the spring washer 16 between the two annular fulcra continuously increases, effecting cushioning having parabolic, gently-sloping characteristics similar to those of the conventional cushioning plates.

The cushioning action or the spring washer 16 continues until its radially inner margin comes into contact with the bottom surface 12c of the channel 50, whereupon an applied load obtains according to the characteristics of the diaphragm spring 11 elasticity.

In this embodiment, the spring washer is of flat, simple form, providing more accurate cushioning than through the conventional cushioning plates; furthermore, the spring washer 16 is located ulterior to the friction facings 2a, where high temperatures are generated, promoting longevity of desirable cushioning characteristics.

When the release fork 4 extracts the release assembly 3 transmission-ward, the radially middle portion of the diaphragm spring 11 is thus drawn transmission-ward, wherein the first pivot ring 13 located in the clutch cover 10 acts as a fulcrum. The spring washer 16 returns to its initial set position as shown in FIG. 2, and the radially middle portion of the diaphragm spring 11 comes Into abutment against the bent portion 14a of the retaining plate 14. Thereupon, the diaphragm spring 11 draws the pressure plate 12 apart from the friction facings 2a through the retaining plate 14, thereby releasing engagement of the clutch disc 2.

Figure 4:
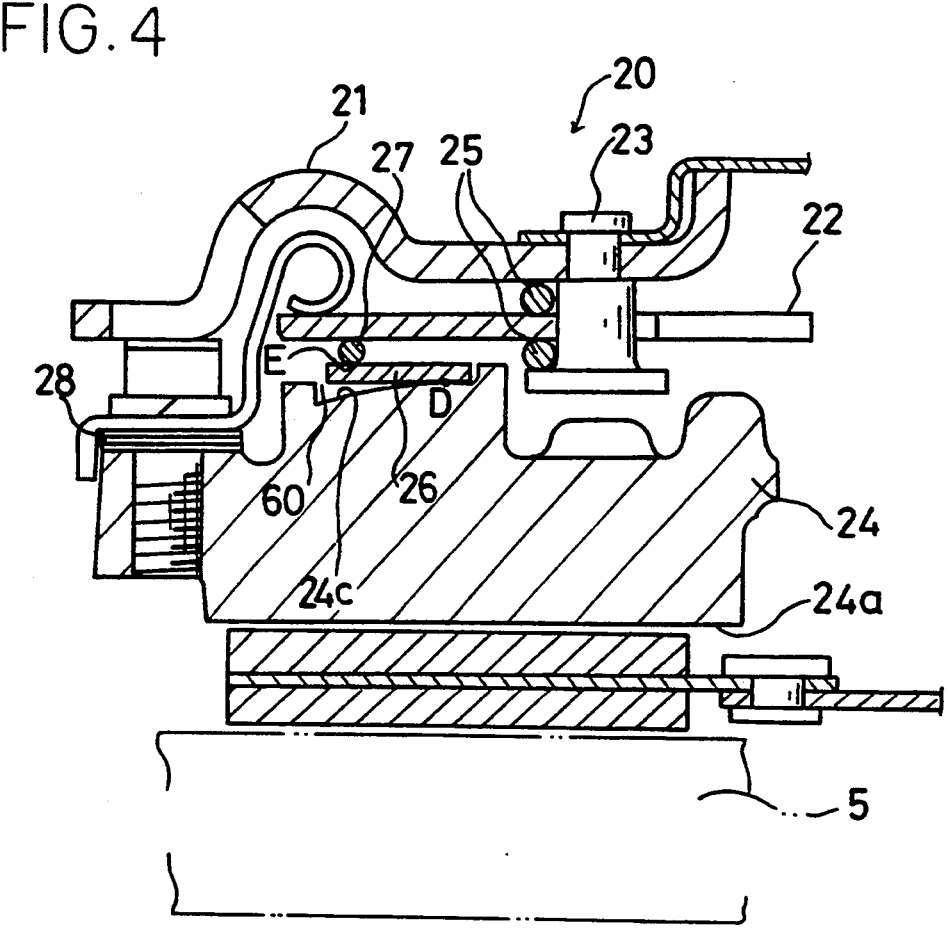
FIG. 4 is a view of the another embodiment, corresponding to FIG. 2.

OTHER EMBODIMENTS (a) FIG. 4 shows detail of a clutch cover assembly 20 according to another embodiment of the present invention. This clutch cover assembly 20 is employed in a push-type clutch.

The clutch cover assembly 20 chiefly consists of a dish-like clutch cover 21, the outer margin of which is fixed to the flywheel 5, a diaphragm spring 22 disposed within the clutch cover 21, and an annular pressure plate 24.

The diaphragm spring 22 is coaxial with the clutch cover 21, its radially middle portion being supported by the clutch cover 21 through stud pins 23 and a pair of first pivot rings 25 which function as fulcra. One end of each stud pin 23 is caulked to the clutch cover 21.

One end face of the pressure plate 24 is a pressure facing 24a, and along a peripheral crown on the opposite end face is an annular channel 60. A bottom surface 24c of the channel 60 curves such that it deepens in the radially outward direction. The spring washer 26 is contained in the channel 60, wherein the radially inner margin of the spring washer 26 is supported on an annular locus of the bottom surface 24c (along annular fulcrum D in FIG. 4), and the radially outer margin on the opposite side of the spring washer 26 is supported by the diaphragm spring 22 through a second pivot ring 27 (along annular fulcrum E in FIG. 4).

The pressure plate 24 Is connected to the clutch cover 21 by strap plates 28.

In this push-type clutch as thus illustrated in FIG. 4, the spring washer 26 elastically deforms during clutch engagement wherein the annular locus of fulcrum contact supporting the spring washer 26 along the bottom surface 24c gradually moves from D radially outward. Consequently, as the spring washer 26 is compressed, the distance between the annular fulcra decreases, thus effective rigidity therebetween is increased. Thus in this embodiment, parabolic cushioning characteristics as shown by the solid line in FIG. 6 obtain.

Figure 5:
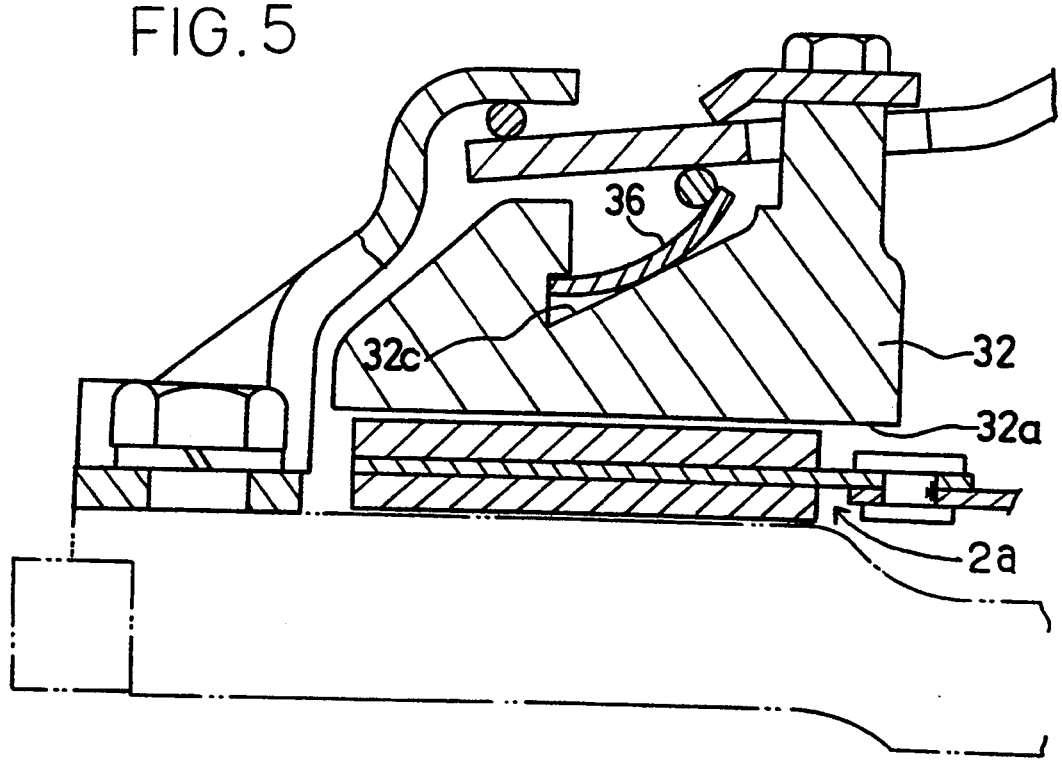
FIG. 5 is a view of still another embodiment, corresponding to FIG. 2.

(b) As shown in FIG. 5, an annular, axially incurvate spring washer 36 can be employed in place of the annular, flat spring washer. In this case, a bottom surface 32c of a channel in the pressure plate 32 is inclined in cross-section, but has radially-constant surface. When the pressure plate 32 presses adjacent friction facings, the spring washer 36 deforms, whereupon the annular locus on which the spring washer 36 is supported by the pressure plate 32 shifts such that the distance between the supporting annular fulcra gradually decreases. Consequently, parabolic, gently-sloped cushioning characteristics obtain, similar to those of assemblies in which conventional cushioning plates are employed.

Various details of the present invention may be changed without departing from its spirit nor scope. Furthermore, the foregoing description of the embodiments according to the present invention is provided for the purpose of illustration only, and not for the purpose of limiting the invention as defined by the appended claims and their equivalents.

What is claimed is:

1. A clutch cover assembly functioning to clamp a clutch disc between a component of the assembly and an input plate member, comprising:
   a dish-shaped clutch cover for connection to said input plate member;
   a pressure-facing surfaced pressure plate disposed within said clutch cover, for pressing said clutch disc against said input plate member, an end surface of said pressure plate opposite of said pressure-facing surface is so recessed annularly as to form a channel having a bottom curving axially away from one of annular fulcra;
   a diaphragm spring supported by said clutch cover, for impelling said pressure plate toward said input plate member;
   a spring washer, disposed between said pressure plate and said diaphragm spring, which elastically deforms in transmitting impelling force of said diaphragm spring to said pressure plate, opposite sides of said spring washer are surfaces having radially constant slope; and
   a ring element disposed between said spring washer and said diaphragm spring, as said one of said annular fulcra; wherein,
   radially inner and outer margins of said spring washer are supported on opposite sides thereof by said pressure plate and said diaphragm spring on respective annular fulcra which in clutch disengagement are staggered laterally of said spring washer and remote from each other;
   in the deformation of said spring washer, a locus of fulcrum contact shifts such that distance between the fulcra decreases;
   said one of said annular fulcra is radially inward, and a remaining of said annular fulcra is radially outward, of said spring washer; and
   a radially outward margin of said diaphragm spring is supported by said clutch cover, and a radially middle portion of said diaphragm spring presses said spring washer through said ring element along said radially inward annular fulcrum.

2. A clutch cover assembly according to claim 1, wherein said diaphragm spring has a plurality of circumferentially disposed holes through its radially middle portion;
   and said pressure plate, on a surface adjacent said diaphragm spring, is provided with a plurality of dowels extending through said plurality of holes; said clutch cover assembly further comprising:
   a retention member attached to said plurality of dowels, supporting a surface of said diaphragm spring ulterior to said pressure plate.

3. A clutch cover assembly according to claim 2, wherein said retention member Is an annular plate having a bent portion along its radially outward margin inclined toward said pressure plate.

4. A clutch cover assembly functioning to clamp a clutch disc between a component of the assembly and an input plate member, comprising:
   a dish-shaped clutch cover for connection to said input plate member;
   a pressure-facing surfaced pressure plate disposed within said clutch cover, for pressing said clutch disc against said input plate member, an end surface of said pressure plate opposite of said pressure-facing surface is so recessed annularly as to form a channel;
   a diaphragm spring supported by said clutch cover, for impelling said pressure plate toward said input plate member;
   a spring washer received in said channel on said pressure plate for transmitting impelling force of said diaphragm spring to said pressure plate, said spring washer being axially incurrate such that an end thereof extends in a direction away from a bottom surface of said channel; and
   a ring element disposed between said spring washer and said diaphragm spring, as one of annular fulcra; wherein,
   radially inner and outer margins of said spring washer are supported on opposite sides thereof by said pressure plate and said diaphragm spring on respective annular fulcra which in clutch disengagement are staggered laterally of said spring washer and remote from each other;

in the deformation of said spring washer, a locus of fulcrum contact shifts such that distance between the fulcra decreases;

said one of said annular fulcra is radially inwards, and a remaining of said annular fulcra is radially outward, of said spring washer; and a radially outward margin of said diaphragm spring is supported by said clutch cover, and a radially middle portion of said diaphragm spring presses said spring washer through said ring element along said radially inward annular fulcrum.

5. A clutch cover assembly according to claim 4, wherein said bottom surface of said channel has a radially constant slope.

6. A clutch comprising:
a flywheel connectable to an input plate member;
a clutch disc assembly, connectable to an output member and disposed laterally of said flywheel, including a flat plate having a friction material facing attached to opposite sides thereof; and
a clutch cover assembly, including
a dish-shaped clutch cover for connection to said input plate member;
a pressure-facing surfaced pressure plate disposed within said clutch cover, for pressing said clutch disc against said input plate member, an end surface of said pressure plate opposite of said pressure-facing surface is so recessed annularly as to form a channel having a bottom curving axially away from one of annular fulcra;
a diaphragm spring supported by said clutch cover, for impelling said pressure plate toward said input plate member;
a spring washer, disposed between said pressure plate and said diaphragm spring, which elastically deforms in transmitting impelling force of said diaphragm spring to said pressure plate, opposite sides of said spring washer are surfaces having radially constant slope; and
a ring element disposed between said spring washer and said diaphragm spring, as said one of said annular fulcra; wherein,
radially inner and outer margins of said spring washer are supported on opposite sides thereof by said pressure plate and said diaphragm spring on respective annular fulcra which in clutch disengagement are staggered laterally of said spring washer and remote from each other;
in the deformation of said spring washer, a locus of fulcrum contact shifts such that distance between the fulcra decreases;
said one of said annular fulcra is radially inward, and a remaining of said annular fulcra is radially outward, of said spring washer; and
a radially outward margin of said spring is supported by said clutch cover, and a radially middle portion of said diaphragm spring presses said spring washer through said ring element along said radially inward annular fulcrum.

* * * * *